United States Patent
Woll

(10) Patent No.: US 7,769,609 B1
(45) Date of Patent: Aug. 3, 2010

(54) SYSTEMS AND METHODS FOR DETERMINING TERRITORIAL RATES

(75) Inventor: Richard G. Woll, Livermore, CA (US)

(73) Assignee: Allstate Insurance Company, Northbrook, IL (US)

( * ) Notice: Subject to any disclaimer, the term of this patent is extended or adjusted under 35 U.S.C. 154(b) by 1340 days.

(21) Appl. No.: 11/057,162

(22) Filed: Feb. 15, 2005

Related U.S. Application Data

(60) Provisional application No. 60/573,925, filed on May 25, 2004, provisional application No. 60/573,928, filed on May 25, 2004.

(51) Int. Cl.
*G06Q 40/00* (2006.01)
(52) U.S. Cl. .......................................................... 705/4
(58) Field of Classification Search ....................... 705/4
See application file for complete search history.

(56) References Cited

U.S. PATENT DOCUMENTS

| | | | |
|---|---|---|---|
| 5,796,634 A | 8/1998 | Craport et al. | |
| 6,028,550 A | 2/2000 | Froeberg et al. | |
| 6,186,793 B1 * | 2/2001 | Brubaker | 434/107 |
| 6,223,164 B1 * | 4/2001 | Seare et al. | 705/2 |
| 2002/0161609 A1 * | 10/2002 | Zizzamia et al. | 705/4 |
| 2005/0262062 A1 | 11/2005 | Xia | |

FOREIGN PATENT DOCUMENTS

EP  1092950 A1  4/2001

OTHER PUBLICATIONS

United States Postal Service, "National Zone Chart Program, Technical Guide 2003-2004", May 2003.
U.S. Appl. No. 11/057,163, entitled "Systems and Methods for Creating Geographic Connection Matrices," filed Feb. 15, 2005.

* cited by examiner

*Primary Examiner*—Charles R Kyle
*Assistant Examiner*—Seth Weis
(74) *Attorney, Agent, or Firm*—Finnegan, Henderson, Farabow, Garrett & Dunner, LLP

(57) ABSTRACT

Methods and systems use regions defined by ZIP codes to adjust loss cost data. First, historical loss costs are identified by ZIP code, and then organized into an order. The organized historical loss costs are assigned a unique loss cost value for each ZIP code, which are then compared to surrounding ZIP codes using a neighborhood model. ZIP codes are grouped into regions of similar loss costs and the regions are organized into territories.

18 Claims, 9 Drawing Sheets

External Arguments:
        cov    Coverage
        period    Exposure Years Program        Basic Neighborhood Process

```
Credibility Parameter Table #1

:IF          cov=BI   ?   base= 400   1600
:ELSEIF      cov=PD   ?   base= 200    600
:ELSEIF      cov=NF   ?   base= 300   1200
:ELSEIF      cov=LB   ?   base= 200    800
:ELSEIF      cov=OL   ?   base= 200    600
:ELSEIF      cov=DM   ?   base= 200    600
:ELSEIF      cov=CL   ?   base= 200    600
:ELSEIF      cov=CP   ?   base= 500   2000
:ELSEIF      cov=TT   ?   base= 200    800
:ENDIF
```

Note:
    BI        Bodily Injury Liability
    PD        Property Damage Liability
    NF        No Fault
    LB        Liability (BI, PD, MP, NF, UM)
    OL        Liability other than PD
    DM        PD and CL
    CL        Collision
    CP        Comprehensive
    TT        All Coverages

```
Credibility Parameter Table #2 (Variable name = "cred")

1       .05       .50
        2       .30       .60
        3       40        .70
        4       .50       .80
        5       .60       .90
``` zipSet = The list of mappable Zip Codes (we get them from an external file)

roZS = Number of mappable Zip Codes nb    = Neighborhood ZIP Code matrix.

Fig. 5

Portion of Kansas Neighborhood Matrix

|       | 66002 | 66006 | 66007 | 66008 | 66010 | 66012 | 66013 | 66014 |
|-------|-------|-------|-------|-------|-------|-------|-------|-------|
| 66002 | 1     | 6     | 3     | 2     | 0     | 4     | 8     | 0     |
| 66006 | 6     | 1     | 5     | 7     | 5     | 4     | 4     | 5     |
| 66007 | 3     | 5     | 1     | 4     | 0     | 2     | 6     | 0     |
| 66008 | 2     | 7     | 4     | 1     | 0     | 5     | 0     | 0     |
| 66010 | 0     | 5     | 0     | 0     | 1     | 8     | 5     | 2     |
| 66012 | 4     | 4     | 2     | 5     | 8     | 1     | 5     | 8     |
| 66013 | 8     | 4     | 6     | 0     | 5     | 5     | 1     | 5     |
| 66014 | 0     | 5     | 0     | 0     | 2     | 8     | 5     | 1     |

Fig. 6

| … | … |
| 1111222 | 67475 |
| 1111222 | 67360 |
| 1111222 | 67102 |
| 111211 | 67417 |
| 111211 | 67459 |
| 111211 | 66940 |
| 111211 | 67025 |
| 111211 | 66780 |
| 111211 | 67134 |
| … | … |

Fig. 8

| 18.12 | 35.17 | 59.38 | 62.46 | 85.79 |
|---|---|---|---|---|
| 335,509.18 | 335,492.13 | 335,467.92 | 335,464.84 | 335,441.51 |

Fig. 9

SYSTEMS AND METHODS FOR DETERMINING TERRITORIAL RATES

RELATED APPLICATIONS

This application claims the benefit of priority from U.S. Provisional Application No. 60/573,925, entitled "Systems and Methods for Determining Territorial Rates," filed May 25, 2004, and U.S. Provisional Application No. Application No. 60/573,928, entitled "Systems and Methods for Creating Geographic Connection Matrices," filed May 25, 2004, the disclosure of each which are expressly incorporated herein by reference in their entirety.

The disclosure of the present invention is related to U.S. application Ser. No. 11/057,163, entitled "Systems and Methods for Creating Geographic Connection Matrices," filed Feb. 15, 2005, the disclosure of which is expressly incorporated herein by reference in its entirety.

TECHNICAL FIELD

The present invention relates to determining territorial rates using a neighborhood or regional method to smooth data.

BACKGROUND

Generally, "insurance" is an agreement by which an insurer, sometimes referred to as an underwriter, undertakes to indemnify the insured party against loss, damage, or liability arising from certain risks, in exchange for consideration. The consideration paid by an insured party is typically referred to as a "premium," which is paid to keep the insurance in effect. An "insurance policy" is a contract of insurance that defines the rights and duties of the contracting parties. A typical insurance policy includes limits on the amount of risk that the insurer will cover.

For the purposes of the following discussion, an "insurance product" includes more than the insurance policy. It also includes services, distribution channels, and other components that may impact the customer experience.

Property insurance protects persons or businesses from financial loss caused by perils. Perils can include losses due to fire, water, earthquake, wind, explosions, aircraft damage (as when an aircraft crashes into a structure), lightning, hail, riot or civil commotion, smoke, vandalism, falling objects, theft, volcanic eruptions, and freezing. An insurance policy providing property insurance may cover some or all of these categories of perils. By paying a premium on a regular basis, a policyholder is insured against a loss caused by a peril within the scope of the policy.

Insurance rates are determined through an actuarial process. The process looks at data related to customer characteristics to determine differences in expected loss costs for different customers. One part of the actuarial process, referred to as "territorial ratemaking," is an actuarial process for adjusting rates used in insurance or other risk transfer mechanisms based on location. The ratemaking process is prospective because property and casualty rates are typically developed prior to the transfer of risk from a customer to an insurance company. Since insurance policy rates reflect an estimate of the expected value of future costs, estimates of future losses are used when determining insurance rates.

By analyzing loss-cost data of a region over a number of years, a company can estimate future exposure to risk more accurately by invoking mathematical methodologies. In the insurance industry, a common practice for determining rates involves estimating future costs by looking at past loss-cost data. Different actuarial methodologies have been developed to further improve the credibility of the data available in the ratemaking process.

The credibility of the data is considered the predictive value that an actuary attaches to a particular body of data. One way of increasing the credibility of the data is to increase the size of the group or to make groupings more homogeneous. Loss-cost data is frequently broken down into regions defined by postal ZIP codes as a convenient subset of a county or state. In fact, actuaries often use information from the government in ratemaking. Some ZIP codes, however, may have little or no recent data with which to predict expected loss costs and thus determine appropriate future premiums.

A "loss-cost property-estimating methodology" identifies, organizes, and stratifies five-year historical loss costs by ZIP code and uses geographical spatial-smoothing techniques. Each ZIP code is assigned a new loss-cost value, and the new smoothed loss-cost data by ZIP code can be further processed to form rating zones.

Although many actuarial methods have been developed to improve the credibility of data in the ratemaking process, the absence of data in certain regions may lower the data's predictive value. By increasing the predictive value of the data only slightly, an insurance company may gain a significant advantage over its competition.

The values of pure premium data can vary significantly between ZIP codes and from year to year. In addition, losses from a given peril are sometimes just as likely to occur near the actual location as at that location. The loss may have occurred near a ZIP-code boundary, however, and the adjacent ZIP code may have had few if any such losses during the period being measured. Consequently, it is useful to incorporate the experience of neighboring properties while recognizing that the relevance of the neighboring experience will diminish with distance.

Different methodologies have been used to smooth data. "Spatial filtering" describes the methods used to compute spatial density estimates for events that have been observed at various geographically-defined locations. Spatial filters rely on nearby adjacent values to estimate a value at a given point. The filters reduce the variability in a data set while retaining the local features of the data. By applying this technique to pure premiums, one can identify areas that have larger or smaller values then average.

In a geospatial method, pure premium data is compared and mathematically adjusted with respect to neighboring regions such as ZIP codes. This is accomplished by comparing the pure premium of a given ZIP code to all the other ZIP codes in the state. The loss cost data is weighted to reflect its geographical relationship or the distance of the target ZIP code from the individual ZIP codes in the state or targeted region.

In a geospatial smoothing method, a line is computed from the geographic centroid of a target ZIP code to the geographic centroid of each individual ZIP code in the state. Then, the pure premiums are weighted based on their relative distance from the subject ZIP code.

SUMMARY

A method for adjusting loss cost data consistent with the present invention comprises identifying historical loss cost by ZIP code; organizing the historical loss costs using a data processor; assigning a unique loss cost value for each ZIP code; comparing the loss cost values for each ZIP code to surrounding ZIP codes using a neighborhood model; and grouping ZIP codes into regions of similar loss costs.

A system for adjusting loss cost data consistent with the present invention comprises a data processor; a module for identifying historical loss costs by ZIP code; a module for organizing the historical loss costs; a module for assigning a unique loss cost value for each ZIP code; a module for comparing the loss cost values for each ZIP code using the data processor; a module for comparing the loss cost value for each ZIP code to surrounding ZIP codes using a neighborhood model; and a module for grouping ZIP codes into regions of similar loss costs.

BRIEF DESCRIPTION OF THE DRAWINGS

All descriptions are exemplary and explanatory only and are not intended to restrict the invention, as claimed. The accompanying drawings, which are incorporated in and constitute a part of this specification, illustrate embodiments of the invention and, together with the description, serve to explain the principles of the invention. In the drawings:

FIG. 5 shows a program for implementing the process of FIG. 1;

FIG. 6 is a partial illustration of a matrix resulting from the execution of the program in FIG. 5;

FIG. 8 is a portion of the results produced in an analysis of Kansas ZIP code data;

FIG. 9 shows the exposures for the first five splits in the Kansas data; and

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Systems and methods consistent with the present invention process data geographically identified by regions, such as ZIP codes. While the following is described in terms of using ZIP codes to designate regions, the present invention is not limited to using ZIP codes. Any geographic region may be considered consistent with the present invention. For example, a method consistent with embodiments of the present invention reassigns a loss-cost value for a particular ZIP code using the loss-cost experience of neighboring ZIP codes. The new data can be used to assign ratemaking factors or as input into a territory or zone creation process that are then used to assign ratemaking factors.

A geospatial smoothing technique normalizes pure premium data. The data can be organized around any convenient geographically defined regions, such as postal ZIP code. The methodology provides a more accurate mechanism to evaluate expected losses at specified locations by using the experience of neighboring ZIP codes in a logically weighted method to smooth the data and compensate for anomalies in the values of the pure premium data set.

Pure premiums can be greatly affected by location. As a result, using the geographical relationship of neighboring regions is a very powerful tool in the ratemaking process. However, not all regions correlate well, so additional methods have been developed that apply credibility factors more efficiently and adjust for the relative geographical relationship to the target ZIP code.

Figure 1:
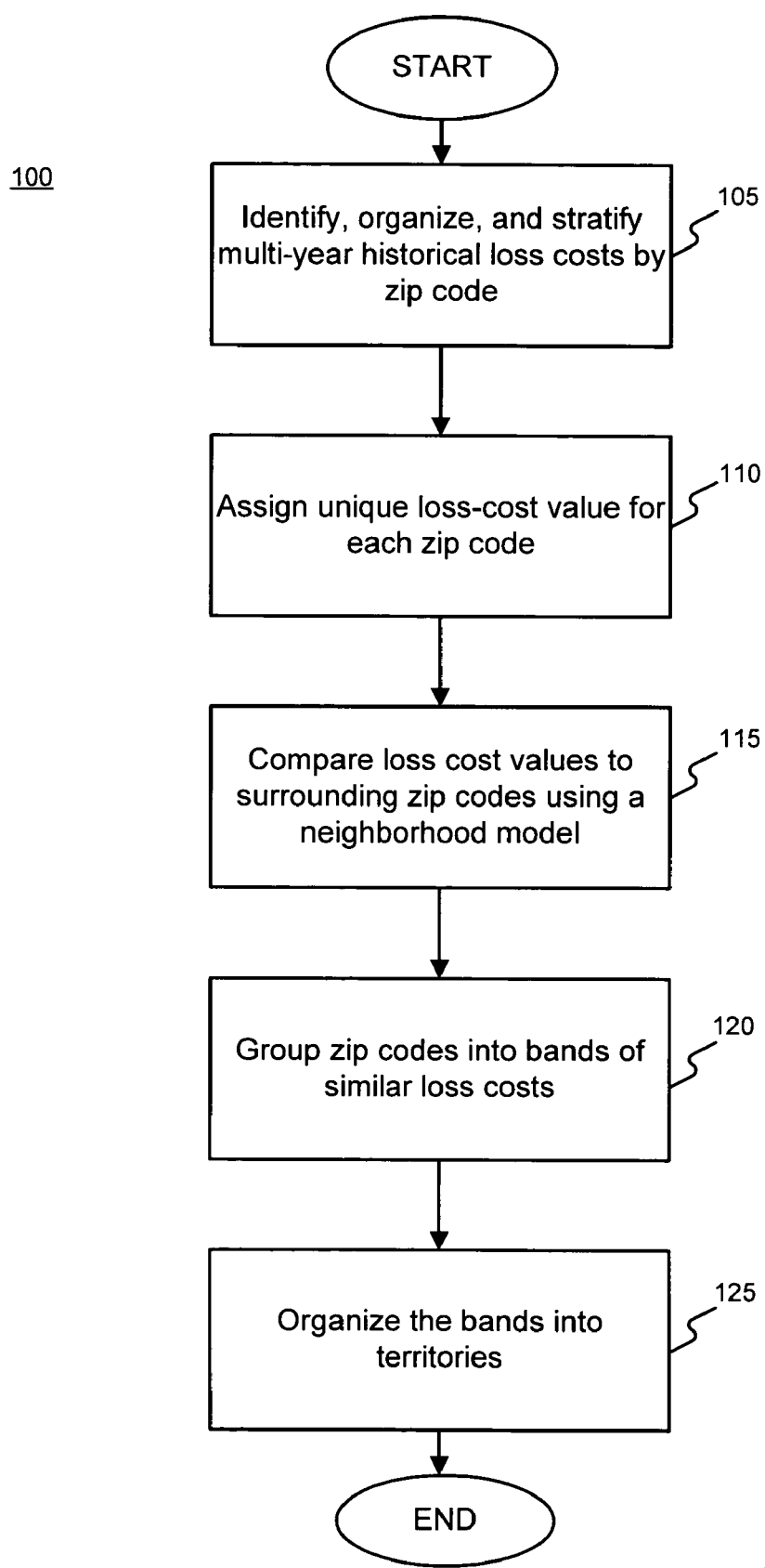
FIG. 1 shows a flowchart of a process that can use regions defined by ZIP codes to adjust loss cost data mathematically to reflect the loss-cost experience of neighboring regions.

FIG. 1 shows a flowchart of a process 100 that can use regions defined by ZIP codes to adjust loss cost data mathematically to reflect the loss-cost experience of neighboring regions. The process is preferably carried out by a data processing system.

First, the data processing system identifies, organizes, and stratifies multi-year historical loss costs by ZIP code. Step 105. Next, the system determines a unique loss-cost value for each ZIP code. Step 110. The system then compares the loss cost values to surrounding ZIP codes using a neighborhood model. Step 115. The system then organizes the ZIP codes into groups or bands (Step 120) and organizes the bands or groups into territories (Step 125).

Figure 2:
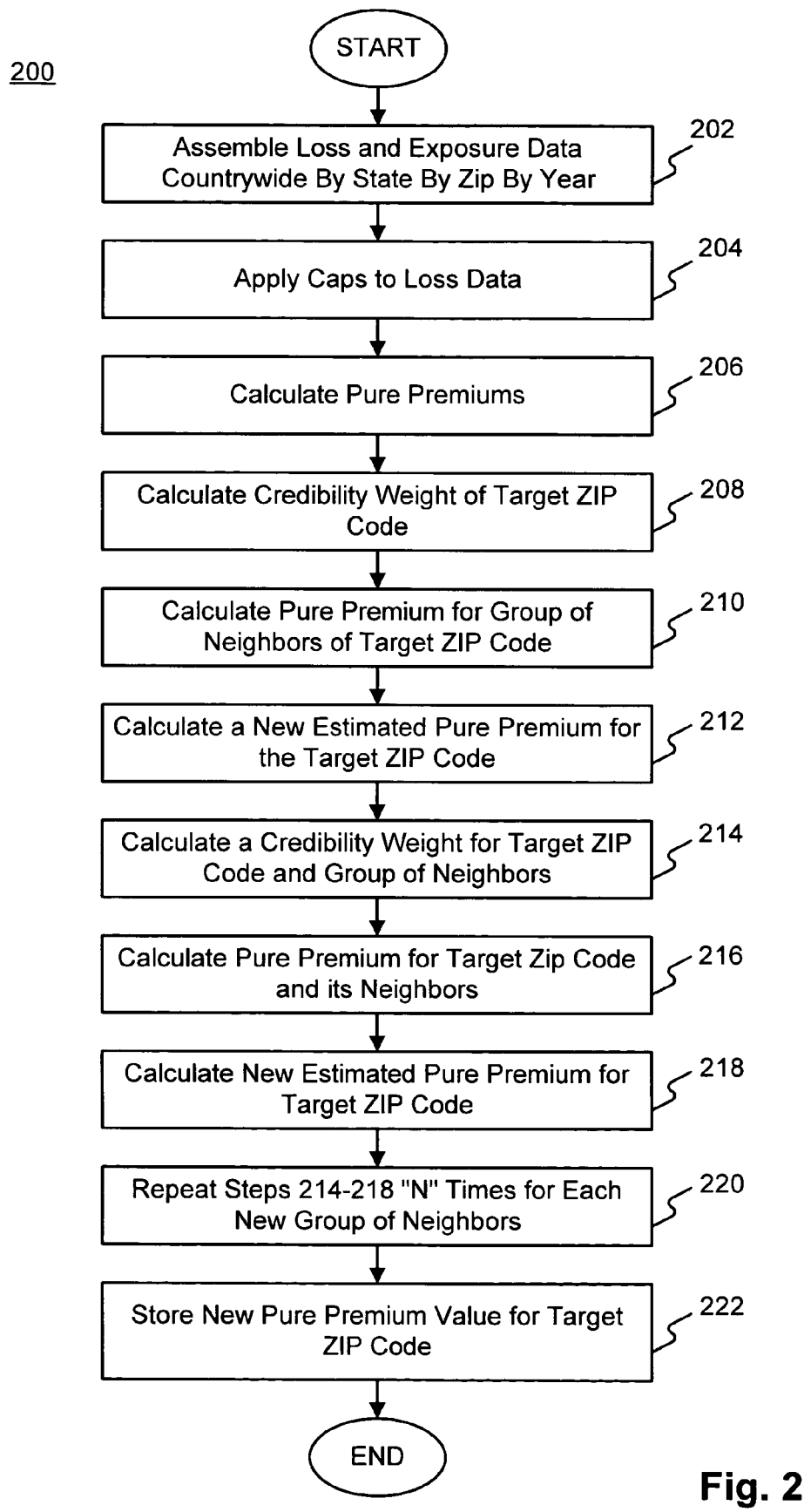
FIG. 2 is a flow chart of a detailed process for a neighborhood methodology for determining rates.

FIG. 2 is a flow chart of a detailed process 200 for a neighborhood methodology for determining rates. First, loss and exposure data is retrieved countrywide for each state and is grouped for each state by ZIP code and by year. Step 202. Next, caps are applied to the loss data and data pertaining to catastrophes is eliminated. Step 204. This is done to eliminate data above values that would otherwise skew the results.

Then pure premiums are calculated by dividing losses by exposures for each ZIP code. Step 206. Next, a credibility weight is calculated for a target ZIP code. Step 208. A credibility weight is preferably a value between 0 and 1 and provides an estimate of certainty.

A pure premium is calculated for the immediate neighbors of the target ZIP code. Step 210. The neighbors are found by applying a neighborhood model. When applying the neighborhood model, a region is formed that is frequently in the shape of a ring that surrounds the target ZIP code. A neighbor is any ZIP code having a border that touches any portion of the border of the target ZIP code. Although the region is described as a ring, the region may be of any appropriate shape or size. Next, a new estimated pure premium is calculated for the target ZIP code. Step 212.

Preferably, the new estimated pure premium is calculated by summing two products. First, the product of the pure premium of the target ZIP code and the credibility weight of the target ZIP code is calculated. That result is added to the product of the pure premium of the group of neighboring ZIP codes and one minus the credibility weight of the group of neighboring ZIP codes. This is shown in Equation (1).

$$\text{Estimated } PP = (PP_{target})(CW_{target}) + (PP_{neighbors})(1 - CW_{neighbors}) \quad (1)$$

Next, a credibility weight for the group comprising the original target ZIP code and its immediate neighbors is calculated. Step 214. Then the pure premium of all neighbors of the group comprising the original target ZIP code and its immediate neighbors is calculated. Step 216. This group is determined by forming a second region or ring of ZIP codes around immediate neighbors that have borders touching the border of the first region or ring.

Next, a new estimated pure premium for the target ZIP code is calculated. Step 218. The new estimated pure premium is equal to the sum of the product of the last estimated pure premium that was calculated (e.g., the estimated pure premium arrived at in step 212) and the last credibility weight that was calculated (e.g., the credibility weight of step 214) with the product of the pure premium for the second group of neighbors and one minus the credibility weight of the second group of neighbors, as shown in equation (2).

$$PP_{New\ estimated} = (PP_{last})(CW_{last}) + (PP_{neighbor\ set\ 2})(1 - CW_{neighbor\ set\ 2}) \qquad (2)$$

The processing done in steps 214 through 218 is repeated for each new region or ring of neighbors up to N times. Step 220. N is typically set as five times because the farther out from the target ZIP, the less likely the data will yield results that are predictive of the target ZIP code.

Finally, the new pure premium value for the target ZIP code is stored. Step 222. This new pure premium arrived at through the above process may be considered credible enough to use in new territories. New territories are groupings of ZIP codes that are each assigned the same insurance rates. It is also possible to form territories based on regions that have a common pure premium value that falls within a certain tolerance. The process described above may be repeated for every ZIP code in a state as well as for every peril under consideration.

Figure 3:
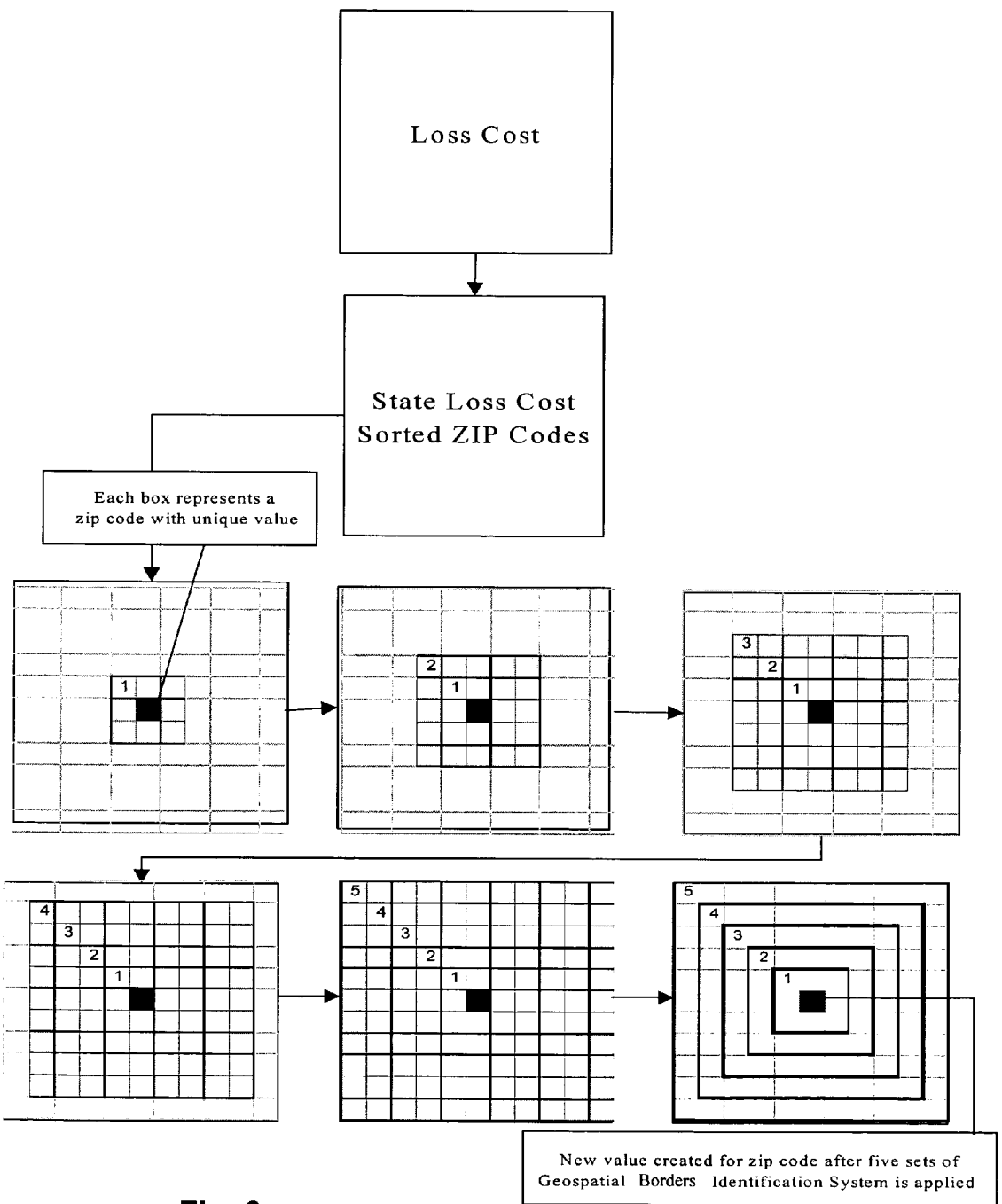
FIG. 3 is a diagram schematically illustrating the process for a neighborhood methodology.

FIG. 3 is a diagram schematically illustrating the process for the neighborhood methodology shown in FIG. 2. As shown in FIG. 3, loss costs are initially sorted by ZIP codes, as described above in connection with FIG. 2. Each box represents a ZIP code with a unique value. FIG. 3 illustrates performing processing consistent with the present invention where N=5. Five different regions or rings of neighbors are shown in the example in FIG. 3. As shown in FIG. 3, data may be considered by forming regions consistent with the process discussed above.

Figure 4:
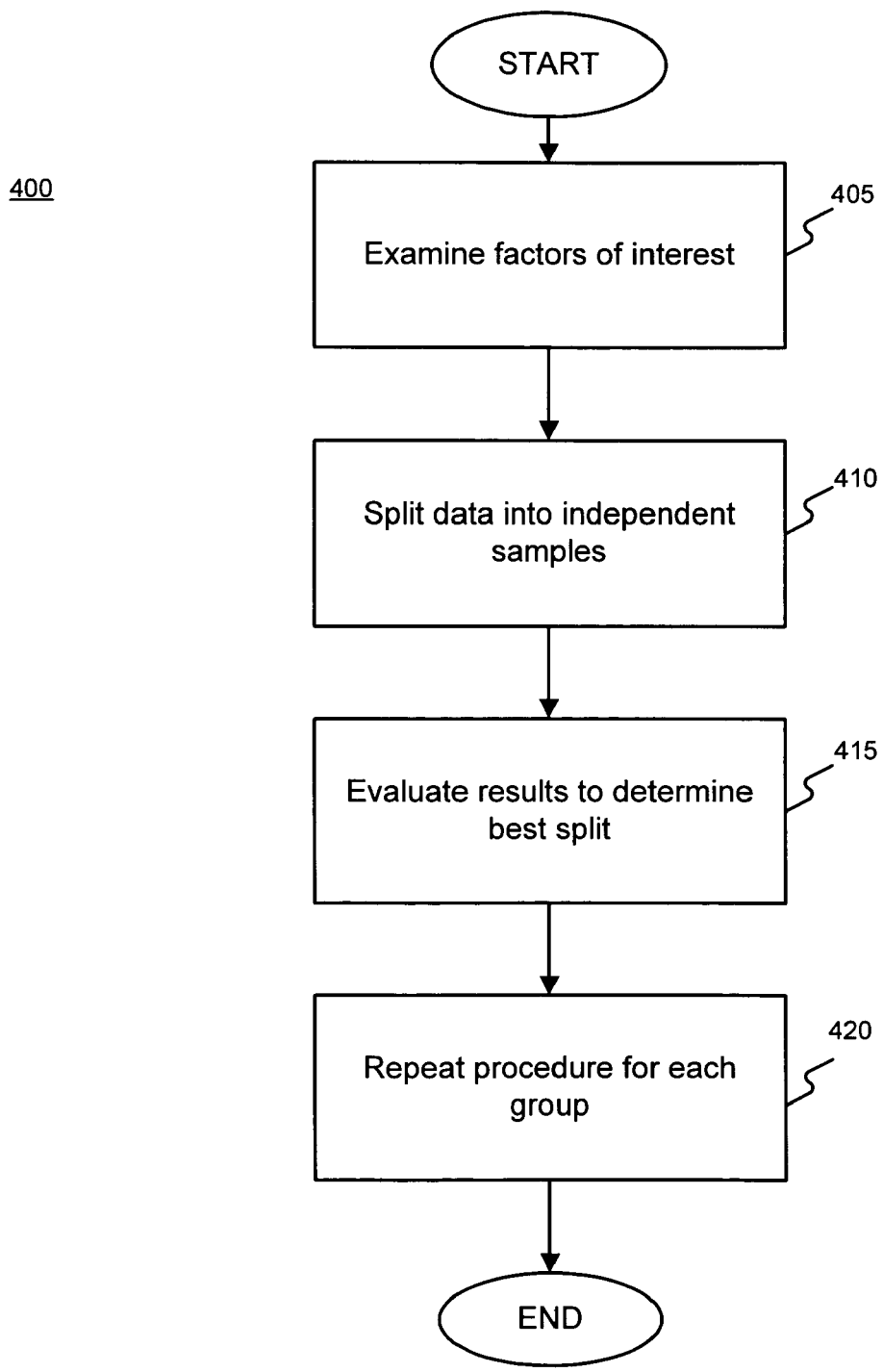
FIG. 4 is a flowchart of an optimal class method to determine what factors and partitions of factors produce the best differentiation between the losses of various groups of insureds.

FIG. 4 is a flowchart 400 of an optimal class method to determine what factors and partitions of factors produce the best differentiation between the losses of various groups of insureds. The method allows different companies to use different factors or groups of factors to produce different insurance rates for consumers. For example, one company might use the number of years a customer has been driving along with the age of the customer, while another might only use age.

An optimal class method uses years of experience as a better factor than using driver age. In this case, the two factors were years of driving experience and age. The partitions of these factors were the possible groups that could be formed from both factors, such as distinguishing between customers with one, two and three years of experience and all other drivers. One might distinguish between teenagers and adults (ages 15-19, and ages greater than 19).

Process 400 begins by having the system look at every factor of interest, such as driver age, years of driving experience, policy age, claim history, mileage, location, type of car, etc. Step 405. The system also splits all the data into two independent samples. Step 410. This is done by sequentially examining each factor and splitting it into two parts in every combination possible.

Next, the system evaluates the results using the covariance between each sample to determine the best split. Step 415. Once the system has completed this evaluation for every factor, it selects the best split as the first branches of a tree. If, for example, the best split was between drivers who were 20 years old or less and all other drivers, the system would select these two groups to form the first two branches of the tree.

After the first split is determined, the system looks at each of the two groups and repeats this procedure for each group. Step 420. Thus, for example, the system examines all the factors for all drivers of age 20 or less in one procedure, and all the other drivers in another procedure. Eventually, the system would determine the best split for each group and would then create two more branches for each group. At this point, for example, there would be four groups.

The system can also perform a statistical test to make sure the splits are "statistically" significant. This process repeats until one has as many branches as desired, or until there are no additional branches that are statistically significant. The results are usually presented in tables and actual "tree" diagrams along with the indicated insurance statistics (such as pure premium or frequency or severity or retention).

The neighborhood method uses one factor (ZIP code), which is the set of final pure premium values for each ZIP code produced by the neighborhood process. The method should split these ZIP codes to form the best possible groups. The best possible groups are those with the most statistically significant differences. Use of the covariance statistic improves the split because it minimizes the role of randomness in the split and helps determine whether a further split should be made.

FIG. 5 shows a program for implementing the process of FIG. 1. The process described by the program performs a neighborhood method for smoothing data to determine territorial rates.

The result of the program in FIG. 5 is a matrix with one row and one column for each ZIP code. FIG. 6 is a partial illustration of the matrix resulting from the execution of the program in FIG. 5. Thus, the program describes the neighborhood relationship for each ZIP code. The first row of the matrix, for example, describes the neighborhood relationships for the first ZIP code. Column 1 and row 1 contain a "1" since the ZIP code is the closest neighbor to itself. All other ZIP codes touching the first ZIP code contain a "2" in the first row and the appropriate column. All other ZIP codes touching the first layer of neighbors have a "3" in the first row and appropriate column. FIG. 5 is a partial illustration of such a matrix. ZIP codes more than nine neighbors away contain a "0" in the appropriate cell in the matrix.

Because even the largest states have fewer than 2000 ZIP codes, the largest matrix takes less than 16 MB of memory, assuming four-byte integers for this data. Floating point data takes twice as much memory.

The following describes the next steps taken in the process of the method shown in FIG. 5:

Make <exb> a 2 by roZS matrix of zeroes

Fill it with earned exposures

Make <lsb> a 2 by roZS matrix of zeroes

Fill it with incurred, capped, ex-cat losses

Make<sol> a 2 by roZS matrix of zeroes

Fill it with the indicated credibility weighted pure premiums

DO S=0 to 1 (Step by one)

ex=exposures$_s$

Exposures are stored by ZIP code, year and holdout sample. At this point, the system reads in the exposures by ZIP code, selected years, and the s$^{th}$ holdout sample. Thus ex is a vector of exposures by mappable ZIPs for the s$^{th}$ holdout sample.

ls=incurred losses$_s$

The system stores losses the same way. Thus it reads in the incurred losses for the selected years, ZIP code, and the s$^{th}$ holdout sample and summarizes over a year.

pp=ls/ex

The system then divides the loss vector by the exposure vector to generate pure premiums:

$$wt = cred[1;2]\max\left[cred[1;3]\min\left(.5 \times \sqrt{\frac{ex}{base[1]}}\right)\right]$$

The system uses the min and max operations with two arguments. Thus 0.5max×means specifies the maximum value between 0.5 and x. The term cred[1;2] refers to the first row and the second column of the Credibility Parameter Table #2, etc. The term base[1] refers to the first value taken from the Credibility Parameter Table #1 for the subject coverage. Since ex is a vector, the term in the radical is a vector divided by a scalar. Since the values in the second and third columns of the cred matrix are 0.05 and 0.5 respectively, the highest value of wt is 0.5 and the lowest is 0.05.

The system then calculates the pure premium for the neighborhood ZIP codes by dividing the total losses for these ZIPs by the total exposures. See equation (3).

$$nbwpp = \frac{\sum ls \times [2]nb = 2}{\sum ex \times [2]nb = 2} \quad (3)$$

The vector ls has a length equal to the number of mappable ZIP codes, and the number of rows and columns in the matrix nb is also the number of mappable ZIP codes. Thus, the system sets the cells of nb equal to zero unless they have a value of two (which means they are immediate neighbors). The system multiples the vector ls by each column of nb and adding each row gives us the total losses for the neighboring ZIP codes. The same is true for ex. Thus, equation (3) yields the average pure premium for all immediate neighbors for each ZIP code. Because the multiplication is over the 2nd dimension, there is a "2" in brackets.

Next, the system calculates the weighted pure premium for the first iteration by multiplying the actual ZIP code pure premium (pp) by the wt vector and then adding the average neighborhood pure premium, nbwpp times (1−wt). See equation (4).

$$wtdpp=(wt \times pp)+((1-wt) \times nbwpp) \quad (4)$$

The second set of weights in the method are quite complex. First, the system calculates a new vector, wt1, as shown in equation (5).

$$wt1 = .6 \times \sum \sqrt{\frac{ex \times [2](nb \in 1, 2)}{base[2]}} \quad (5)$$

The result of the denominator of the expression in the radical is a square matrix with the same rows and columns as the exposure vector, ex. The system uses the square bracket [2] to indicate that we are multiplying each column of the nb matrix by the vector to the left. Next, the system summarizes over each row of the expression in the radical, thus summarizing the exposures for the subject ZIP code and all ZIP codes that are immediate neighbors. (The $\in$ operator means membership).

The system then takes the maximum of this result (wt1), the value of wt calculated earlier times 1.2, and 0.3 and multiplies the result by 0.6. Thus:

$$wt=0.6\min(wt1\max(1.2 \times wt)\max0.3) \quad (6)$$

For the most part, this expression creates a weight value of 0.6 because of the minimum value of 0.6, but some ZIP codes have a weight between 0.3 (the minimum maximum in the last part of the equation) and 0.6.

The system then calculates the pure premium of the second ring of neighbors (ZIP codes with a value of 3 in the nb matrix). This is shown in equation (7).

$$nbwpp = \frac{\sum ls \times [2]nb = 3}{\sum ex \times [2]nb = 3} \quad (7)$$

The system uses the weight just calculated to create a new weighted pure premium by weighting the weighted pure premiums from the first iteration (wtdpp) with the neighborhood pure premium from the second ring (nbwpp).

$$wtdpp=(wt \times wtdpp)+((1-wt) \times nbwpp) \quad (8)$$

After repeating this calculation three more times, the system calculates a new weight:

$$wt=(cred[I;3]\min cred[I;2]\max wt \times 1.2 \quad (9)$$

It also calculates a new neighborhood pure premium, $$nbwpp = \frac{\sum ls \times [2]nb = 1}{\sum ex \times [2]nb = 1} \quad (10)$$

and a new weighted pure premium, $$wtdpp=(wt \times wtdpp)+((1-wt) \times nbwpp) \quad (11)$$

At this point, the system has completed calculating the credibility weighted pure premiums for the neighborhood method for half the policies in our data. It then balances them to the incurred losses for these policies. First, the system calculates an off-balance factor.

$$OB = \frac{\sum ls}{\sum ex \times wtdpp} \quad (12)$$

The system then multiplies this factor by the credibility weighted pure premiums (wtdpp).

$$wtdpp=wtdpp \times OB \quad (13)$$

Then, the system assigns the wtdpp vector to the $s^{th}$ row of the sol matrix, the ex vector to the $s^{th}$ row of the exp matrix, and the ls vector to the $s^{th}$ row of the lsb matrix.

At this point, the system has, using the neighborhood method, two sets of estimates from two random samples comprising the total population. The system uses these estimates to create groups of ZIP codes using a covariance based Optimal Class algorithm. Preferably, the system does this by calling a program named OCL.

OCL produces a two-column matrix where each row corresponds to a ZIP code. The first column contains the group number for that ZIP code, and the second contains the ZIP code. This can be stored or used any way desired. For example, FIG. 6 shows a partial illustration of the matrix resulting from the execution of the program in FIG. 5.

Figure 7:
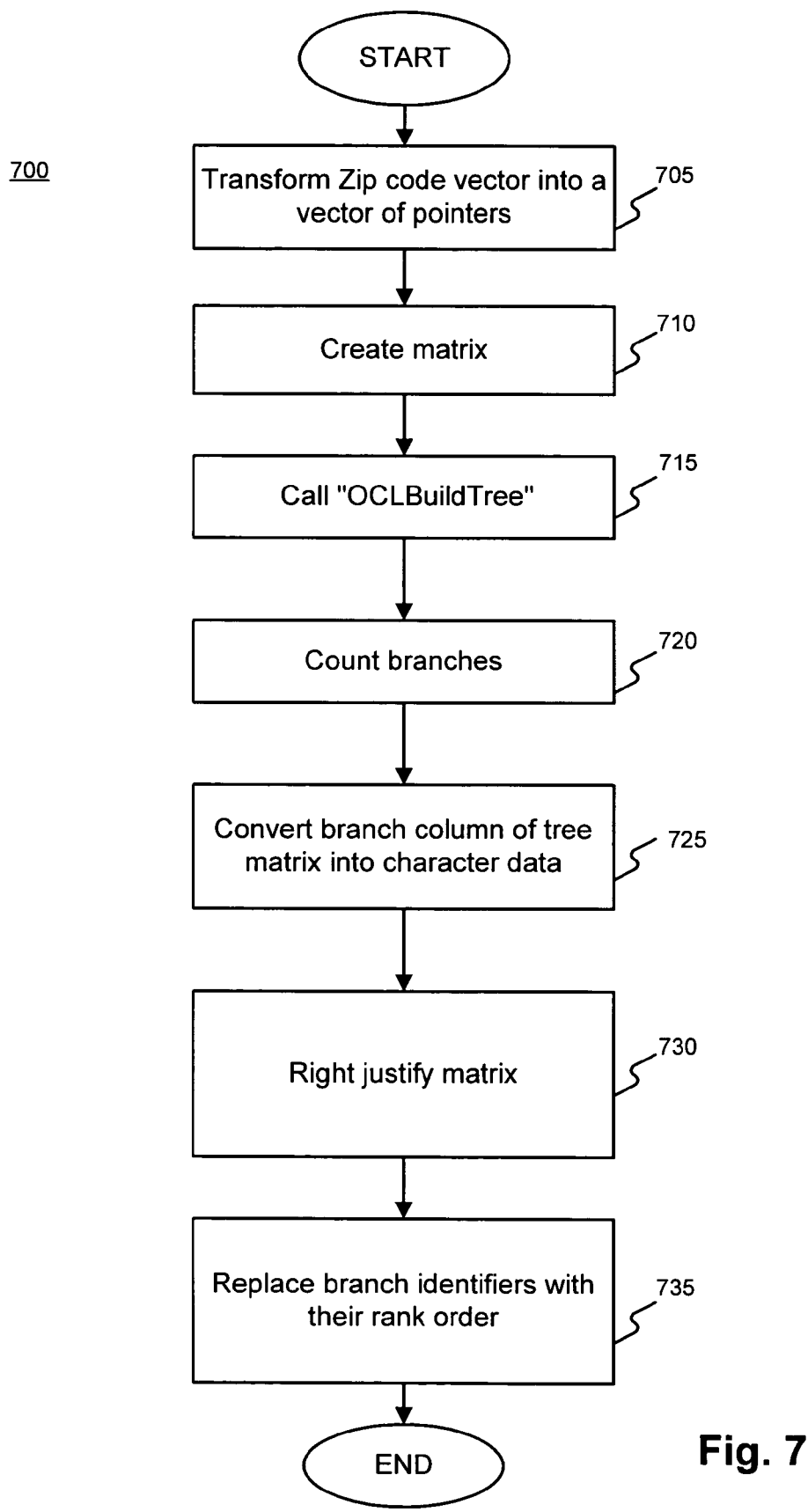
FIG. 7 is a flowchart of the OCL program.

FIG. 7 is a flowchart of the OCL program. That program is recursive and takes two arguments. The left argument identifies where it is in the recursive tree and the right argument is a three-element vector containing ZIP codes, a two-row matrix containing two sample exposure amounts for each ZIP code, and another two row matrix containing the incurred losses (called "VAL") in the program. These are preferably calculated in a program that invokes the OCL program.

First, the system transforms the ZIP code vector into a vector of pointers. (Step 705). This is done for programming reasons. Thus, the ZIP code with the lowest number becomes "1", the ZIP code with the next lowest number becomes "2", and so on. This program also creates a 0 by 2 matrix called "tree" which receives the results of each iteration of the "OCLBuildTree" program. Step 710.

Thus:

$$tree=02\rho 0 \tag{14}$$

The $\rho$ operator in APL refers to the shape of an element. Thus, the tree has zero rows and two columns.

Next, the system calls "OCLBuildTree" (Step 715) as follows:

1 OCLBuildTree (inds EXP VAL)

where inds is the vector of mappable ZIP codes, EXP is the two-row matrix of exposures, and VAL is the two-row matrix of incurred losses. In APL, the expression in brackets is a vector with three elements. This program is described below.

When the "OCLBuildTree" program finishes, the tree matrix has one row for each ZIP code index in inds. The first column contains the branch identifier at the time the ZIP codes in that branch were appended to the matrix, while the second column contains the ZIP code identifiers for that branch. The system preferably counts the branches (Step 720) as follows. The initial branch has the number 1. The next level has the numbers 11 and 12 (assuming it split). The next splits of these, if they exist, get the numbers 111, 112, 121, 122; etc. The higher numbered split is also the split with higher relative pure premiums.

Next, the system converts the branch column of the tree matrix into character data. (Step 725). Thus, the first column of tree becomes a n×1 3 matrix if the highest branch number had twelve digits.

Next the system right justifies this matrix. Step 730. Thus, for example, if some of the rows contained the branch 112121, they would become 112121bbbbbbb.

FIG. 8 is a portion of the results produced in an analysis of Kansas ZIP code data. Thus, ZIP codes 67475 67360 67102 belong to branch 1111222, while ZIP codes 67417 67459 66940 67025 66780 67134 belong to branch 111211. The advantage of this procedure is that sorting the branch identifiers puts each group in order by relative pure premium. In the example in FIG. 8, the lower group has a higher pure premium than the higher group because it represented the higher split at the third iteration. Finally, the system replaces the branch identifiers with their rank order (Step 735), thus producing a matrix with group ranks in the first column and ZIP codes in the second.

An OCL Build Tree program is called recursively with a left argument indicating the branch identifier and the right argument being the three element vector of ZIP code pointers, a two row matrix, EXP, and another two row matrix, VAL.

First, the system disassembles this ZIP-code vector as follows:

inds=↑inds_EXP_VAL[1]
EXP=↑inds_EXP_VAL[2]
VAL=↑inds_EXP_VAL[3]

Next, the system checks the number of ZIP codes in the inds vector. If there is only one, there will be no split, and the system proceeds to the end of the program where it writes the ZIP code out to the tree along with its accompanying branch identifier.

Otherwise, the system runs a Bayesian Credibility program to get a credibility-weighted estimate of the relative pure premium for each ZIP code in the arguments to the program. This program is also preferred because extreme pure premium values are partly the result of higher expected relative values and partly the result of random factors. The credibility procedure tends to push extreme values for ZIP codes with smaller amounts of exposure towards the mean for the group more than those with greater exposure. Thus:

$$rslts=BCred \subset [2]"EXP(VAL \div EXP) \tag{15}$$

where Bcred is the name of our Bayesian Credibility program. VAL÷EXP results in the pure premium. The result of this procedure is a ten element vector. The sixth element in the vector is the set of credibility-weighted estimates of the pure premium. Thus:

$$rslts=6 \supset rslts \tag{16}$$

where the first two elements to the right of the equals sign mean to take the sixth element in the vector to their right.

Next, the system determines the sort order of these results (rslts).

$$oC=\text{Sort OrderOf}(rslts) \tag{17}$$

The system uses this sort order (oC) to rearrange the three input elements, inds, EXP, and VAL. The vector oC is applied to the columns of EXP and VAL. Thus, inds=inds[oC]
EXP=EXP[;oC]
VAL=VAL[;oC]

The system next calculates the covariance of every split of the data between the lower pure premium groups and the higher pure premium groups. To do this, the system calculates the total for each row of the EXP and VAL matrices:

$$ESUMS_i = \Sigma EXP_i, VSUMS_i = \Sigma VAL_i \tag{18}$$

Next, it calculates the mean pure premiums for both rows of data in equation (19):

$$MEANS = {}^{VSUMS}/_{ESUMS} \tag{19}$$

Then, it cumulates the EXP and VAL matrices along each row:

$$CEXP[i;] = \sum_{j=1}^{1} EXP[i;j], \sum_{j=1}^{2} EXP[i,j], \sum_{j=1}^{3} EXP[i,j], \ldots, \sum_{j=1}^{n} EXP[i,j]$$

$$CVAL[i;] = \sum_{j=1}^{1} VAL[i;j], \sum_{j=1}^{2} VAL[i,j], \sum_{j=1}^{3} VAL[i,j], \ldots, \sum_{j=1}^{n} VAL[i,j]$$

where n is the number of ZIP codes and thus the number of columns in each of the two matrices.

The result is two matrices with two cumulated rows, CEXP and CVAL.

The system next makes two element vectors out of each of these matrices:

CEXP=(CEXP) (ESUMS−[1]CEXP)
VEXP=(VEXP) (VSUMS−[1]VEXP)

Thus, each of these vectors is made up of two matrices with two rows each. The system then drops the last column in each of the matrices in these two vectors.

All the elements now exist to evaluate various splits of the data. The first column of the first element in the CEXP vector is the exposures for the first two samples from the first ZIP code. The first column of the second element in the CEXP vector is the exposures for each set of the remaining ZIP codes. The same applies to the various elements in the VAL (incurred losses) matrix.

Now the system needs the relative exposure weights for each split. The exposure weights for the first split are the sums of the exposures in the first columns of each of the matrices in the CEXP vector divided by their sum.

By way of illustration, FIG. 9 shows the exposures for the first five splits in the Kansas data. The total exposures in the first ZIP code in our example are 18.12. The exposures in all remaining ZIP codes are 335,509.18. The total exposures in the first two ZIP codes in our example are 35.17 while the exposures in the remaining ZIP codes are 335,492.13, and so on. The system then divides each column in this matrix by the sum of the columns, 335,527.3 to get the weights. Thus:

$$WT_i = \sum_{j=1}^{2} EXP_i[j;]$$

$$WT = WT[j;] \div \sum_{j=1}^{2} WT[j;]$$

where $WT_j$ is the $i^{th}$ row of the WT matrix, and $EXP_i[j;]$ refers to the $j^{th}$ row of the $i^{th}$ matrix in EXP. The covariance of each split is the product of the two pure premiums for each split times the relative weights, less the product of the average mean pure premium.

The system then divides each column in this matrix by the sum of the column. Thus, $$CV = \left( WT[1] \cdot \frac{VAL_1[1;]}{EXP_1[1;]} \times WT[2] \cdot \frac{VAL_2[1;]}{EXP_2[1;]} \right) - (MEANS[1] \times MEANS[2])$$

CV is a vector of the covariance of the set of splits (which is equal to one less than the number of ZIP codes).

The system determines the location of the split with the highest covariance value.

$$MX = 0MAX(MAX(CV))$$

and determines which split produced MX. The expression in parentheses means that the MAX function is being applied to the vector. MX is set to zero if it is negative.

A simple way to do this is to create a vector of binary ones and zeroes with a value of one if the value of CV is equal to MX and zero otherwise. Multiply this by a vector of numbers from one to n−1 where n is the number of ZIP codes. The maximum value of this result is the location of the split with the highest covariance. Thus:

$$IND = MAX(m \times v))$$

where m=1 if MX=CV and 0 otherwise
and v=1, 2, 3, 4, . . . (n−1)

Before this step, the system eliminates all splits where one of the branches has fewer than 3000 exposures (thus, all of the elements shown in our example above). Note also that IND is zero if MX is zero.

If IND=0, the system does not proceed further with this branch, but goes to the end of the program where it appends the branch number and the ZIP code indices in the branch to the tree matrix.

If IND≠zero, the system splits the data into two parts. The first split contains the first IND ZIP code indices and their associated EXP and VAL, while the second split contains the remainder.

In the Kansas illustration, the first split of the state data occurred at the 447$^{th}$ ZIP code (out of 684 mappable ZIP codes). The relative weights of the split were 0.406 and 0.594 respectively. The sample pure premiums for each branch of the split were 288.7 and 293.3 for each of the samples for the first branch, and 329.9 and 328.4 for each of the samples for the second. Next, each of these pairs are multiplied, then multiplied by the pair of weights, and added together, which yields 98,705.6. The product of the population mean is 98,355.7. Subtracting the product of the population mean from the weighted product of the sample pure premiums yields 349.9. Thus, MX is equal to 349.9. The immediately adjacent splits both gave us values of 349.8. Next, the system calls the "OCLBuildTree" program for each split. Eventually, all branches terminate with a single ZIP code index or a zero value of MX. At the end of the process, premiums may be determined from the results, which are loss costs for each ZIP code.

System Configuration

Figure 10:
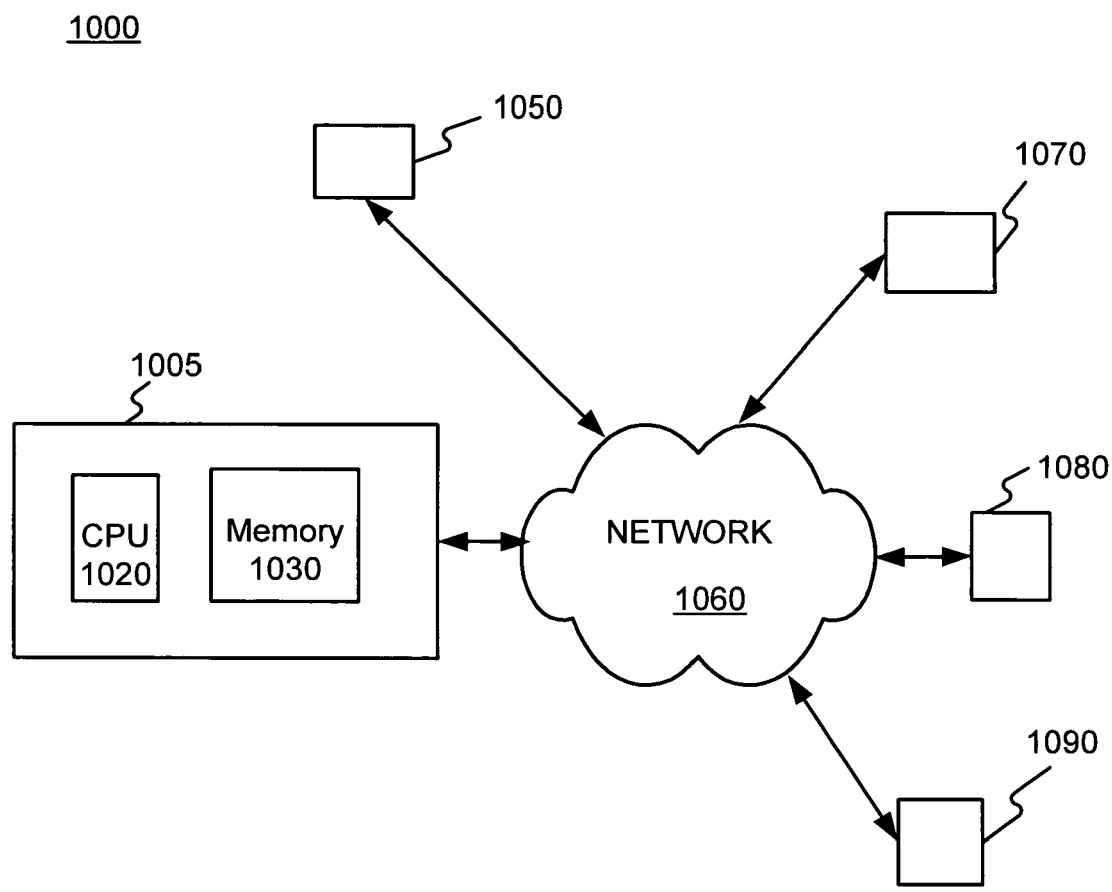
FIG. 10 illustrates a system consistent with the present invention.

FIG. 10 illustrates a system 1000 consistent with the present invention. System 1000 includes a server 1005, connected to a network 1060, including a CPU 1020 and a memory 1030. Software loaded into memory 1030 from, for example, a disk drive (not shown) at the direction of CPU 1020 may be used to implement a program for determining insurance premiums for property. Various program modules may be stored in memory 1030 as software for implementing the functionality of the present invention.

Network 1060 provides communications between the various entities in system 1000, such as user terminals 1070-1090. Network 1060 may be a shared, public, or private network and encompass a wide area or local area. Further, network 1060 may be implemented through any suitable combination of wired and/or wireless communication networks. By way of example, network 1060 may be implemented through a wide area network (WAN), local area network (LAN), an intranet, or the Internet.

Terminals 1070-1090 allow a user to exchange information with server 1060. Terminals 1070-1090 may be any type of appropriate device for communicating with server 1005 over network 1060. For example, terminal 1070 may be a PDA running a program for communicating with server 1005, while terminal 1080 may be a desktop type computer running a web browser for communicating with server 1005 via the Internet. Terminal 1090 may be a standard landline telephone or wireless phone.

Users may access server 1005 via network 1060 to determine insurance premiums for property through a web browser running on, for example, terminal 1080. A website may include options for specifying a customer's location, and may present the user with a series of screens prompting the user to make various selections.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software, but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A method for determining insurance rates comprising:
   retrieving loss and exposure data for a state;
   grouping the loss and exposure data by ZIP code and by time unit data;
   calculating pure premiums for each ZIP code;
   calculating a credibility weight for a target ZIP code;
   defining a first neighbor region comprising ZIP codes that are immediate neighbors of the target ZIP code;
   calculating a pure premium for the first neighbor region;
   calculating a credibility weight for the first neighbor region;
   calculating, using a data processor, a first estimated pure premium for the target ZIP code based on the pure premium for the target ZIP code, the credibility weight for the target ZIP code, the pure premium for the first neighbor region, and the credibility weight for the first neighbor region;
   defining a group including the target ZIP code and the first neighbor region;
   calculating a credibility weight for the group;
   defining a second neighbor region comprising ZIP codes that are immediate neighbors of the group;
   calculating a pure premium for the second neighbor region;
   calculating a credibility weight for the second neighbor region; and
   calculating, using the data processor, a second estimated pure premium for the target ZIP code based on the first estimated pure premium for the target ZIP code, the credibility weight for the group, the pure premium for the second neighbor region, and the credibility weight for the second neighbor region.

2. The method of claim 1, wherein grouping the loss and exposure data includes applying caps to the loss and exposure data.

3. The method of claim 1, wherein the first neighbor region is defined using a neighborhood model.

4. The method of claim 1, wherein the calculating steps and the defining steps are repeated for each ZIP code of the state, wherein the each ZIP code is used as the target ZIP code.

5. The method of claim 4, further comprising:
   defining a territory including the ZIP codes having estimated pure premiums that are the same or within a tolerance.

6. The method of claim 5, further comprising:
   assigning an insurance rate to the territory.

7. A system for determining insurance rates comprising:
   a data processor executing program instructions stored in a computer-readable storage medium to cause the system to perform the steps of:
   retrieving loss and exposure data for a state;
   grouping the loss and exposure data by ZIP code and by time unit;
   calculating pure premiums for each ZIP code;
   calculating a credibility weight for a target ZIP code;
   defining a first neighbor region comprising ZIP codes that are immediate neighbors of the target ZIP code;
   calculating a pure premium for the first neighbor region;
   calculating a credibility weight for the first neighbor region;
   calculating a first estimated pure premium for the target ZIP code based on the pure premium for the target ZIP code, the credibility weight for the target ZIP code, the pure premium for the first neighbor region, and the credibility weight for the first neighbor region;
   defining a group including the target ZIP code and the first neighbor region;
   calculating a credibility weight for the group;
   defining a second neighbor region comprising ZIP codes that are immediate neighbors of the group;
   calculating a pure premium for the second neighbor region;
   calculating a credibility weight for the second neighbor region; and
   calculating a second estimated pure premium for the target ZIP code based on the first estimated pure premium for the target ZIP code, the credibility weight for the group, the pure premium for the second neighbor region, and the credibility weight for the second neighbor region.

8. The system of claim 7, wherein grouping the loss and exposure data includes applying caps to the loss and exposure data.

9. The system of claim 7, wherein the first neighbor region is defined using a neighborhood model.

10. The system of claim 9, wherein the calculating steps and the defining steps are repeated for each ZIP code of the state, wherein the each ZIP code is used as the target ZIP code.

11. The system of claim 10, wherein the system further performs the step of:
    defining a territory including the ZIP codes having estimated pure premiums that are the same or within a tolerance.

12. The system of claim 11, wherein the system further performs the step of:
    assigning an insurance rate to the territory.

13. A computer readable storage medium storing program instructions executable by a data processor for performing the steps of:
    retrieving loss and exposure data for a state;
    grouping the loss and exposure data by ZIP code and by time unit;
    calculating pure premiums for each ZIP code;
    calculating a credibility weight for a target ZIP code;
    defining a first neighbor region comprising ZIP codes that are immediate neighbors of the target ZIP code;
    calculating a pure premium for the first neighbor region;
    calculating a credibility weight for the first neighbor region;
    calculating a first estimated pure premium for the target ZIP code based on the pure premium for the target ZIP code, the credibility weight for the target ZIP code, the pure premium for the first neighbor region, and the credibility weight for the first neighbor region;
    defining a group including the target ZIP code and the first neighbor region;
    calculating a credibility weight for the group;
    defining a second neighbor region comprising ZIP codes that are immediate neighbors of the group;
    calculating a pure premium for the second neighbor region;
    calculating a credibility weight for the second neighbor region; and
    calculating a second estimated pure premium for the target ZIP code based on the first estimated pure premium for the target ZIP code, the credibility weight for the group, the pure premium for the second neighbor region, and the credibility weight for the second neighbor region.

14. The medium of claim 13, wherein grouping the loss and exposure data includes applying caps to the loss and exposure data.

15. The medium of claim 13, wherein the first neighbor region is defined using a neighborhood model.

16. The medium of claim 13, wherein the calculating steps and the defining steps are repeated for each ZIP code of the state, wherein the each ZIP code is used as the target ZIP code.

17. The medium of claim 16, further storing program instructions for performing the step of:

defining a territory including the ZIP codes having estimated pure premiums that are the same or within a tolerance.

18. The medium of claim 17, further storing program instructions for performing the step of:

assigning an insurance rate to the territory.

* * * * *

UNITED STATES PATENT AND TRADEMARK OFFICE
CERTIFICATE OF CORRECTION

PATENT NO. : 7,769,609 B1
APPLICATION NO. : 11/057162
DATED : August 3, 2010
INVENTOR(S) : Richard G. Woll It is certified that error appears in the above-identified patent and that said Letters Patent is hereby corrected as shown below:

In claim 1, column 13, line 16, delete "data" after --time unit--.

Signed and Sealed this

Ninth Day of November, 2010

David J. Kappos
*Director of the United States Patent and Trademark Office*